(12) United States Patent
Ritter

(10) Patent No.: US 10,831,634 B1
(45) Date of Patent: Nov. 10, 2020

(54) REPLICATION OF USER INTERFACE EVENTS

(71) Applicant: SAP SE, Walldorf (DE)

(72) Inventor: Gerd Ritter, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/409,214

(22) Filed: May 10, 2019

(51) Int. Cl.
*G06F 3/00* (2006.01)
*G06F 11/34* (2006.01)
*G06F 9/451* (2018.01)
*G06F 11/36* (2006.01)

(52) U.S. Cl.
CPC .......... *G06F 11/3476* (2013.01); *G06F 9/451* (2018.02); *G06F 11/349* (2013.01); *G06F 11/3438* (2013.01); *G06F 11/3636* (2013.01)

(58) Field of Classification Search
None
See application file for complete search history.

(56) References Cited

U.S. PATENT DOCUMENTS

| 2015/0052502 A1* | 2/2015 | Faillaci, III | G06F 11/3636 717/125 |
| 2017/0337116 A1* | 11/2017 | Negara | G06F 11/3688 |
| 2018/0113794 A1* | 4/2018 | Yang | G06F 11/3668 |

* cited by examiner

*Primary Examiner* — Thanh T Vu
(74) *Attorney, Agent, or Firm* — Buckley, Maschoff & Talwalkar LLC

(57) ABSTRACT

A system and method include detection of a set of sequential interactions with a user interface, storage of a recording comprising data associated with a set of sequential calls to a user interface entry point application programming interface of a server application caused by the set of sequential user interface interactions, association of the recording with an incident identifier, reception of a request to analyze an incident associated with the incident identifier, and, in response to the request, initiation of playback of the recording, wherein playback of the recording comprises reading of the data of the recording and, based on the read data, issuing the set of sequential calls to the user interface entry point application programming interface of the server application.

14 Claims, 9 Drawing Sheets

Request 1

Controller_Init

Event

Data

Request 2

Controller_Init

Event

Request 3

Controller_Init

Event

Event

Data

Data

UI Event Recordings
    Number of records to display  [      ]
    User Alias                    [      ]
    User Name (backend)           [      ]

Selection by Period
    Date From  [      ]
    Time From  [      ]
    Date To    [      ]
    Time To    [      ]

Selection by Identifier
Identifier  [      ] to [      ]

Debugger Breakpoint
Request Number  [      ]

*FIG. 5*

REPLICATION OF USER INTERFACE EVENTS

BACKGROUND

In a conventional support scenario, an end user reports an unexpected error message, application failure or processing error. Support personnel typically attempt to reproduce the issue by executing the same user interface interactions which were executed by the user prior to experiencing the issue. To facilitate this reproduction, the user may describe the interactions or send a video recording of the interactions to the support personnel. Nevertheless, reproduction of the user interface interactions can be quite error prone, since the interactions may be complex and/or the user interface elements may be personalized.

Any differences between the interactions performed by support personnel and the interactions of the user may lead to different application behavior, hindering resolution of the issue. The problem is exacerbated if the issue is escalated to other support personnel, who similarly attempts to recreate the user interface interactions. If the re-creation is unsuccessful, the support personnel must revert to the user in another attempt to identify the exact sequence of user interface interactions which resulted in the issue.

Traces may include events raised and calls made during program execution, while a dump indicates program states at the time of an error. Neither traces nor dumps support reproduction of an issue, and both are difficult to analyze. Debugging tools are commonly used to analyze line-by-line execution but it is difficult to determine which code lines should be analyzed without precise reproduction of the user interface interactions which led to the issue.

The foregoing may lead to unsuitable incident handling times, increased consumption of primary and development support resources, and/or reduced client satisfaction.

BRIEF DESCRIPTION OF THE DRAWINGS

FIG. 3 depicts a block of data describing recorded user interface events according to some embodiments;

FIG. 5 depicts a user interface to select a block of recorded UI event data according to some embodiments;

DETAILED DESCRIPTION

The following description is provided to enable any person in the art to make and use the described embodiments and sets forth the best mode contemplated for carrying out the described embodiments. Various modifications, however, will remain apparent to those in the art.

Embodiments may provide technical improvements over existing systems by facilitating the recording and replay of user interface (UI) interactions. For example, the selection of UI elements and entry of data into a UI by a user over a particular period of time may be captured in a data structure. Data of the data structure may be used to make successive calls to a UI entry point of an application in the same manner as the entry point was called in response to the UI interactions of the user. In response, the application should function in the same manner as in response to the UI interactions of the user. According to some embodiments, the calls are replayed on the database tenant of the original user, and under the original user's credentials.

In some embodiments, a debugger breakpoint may be set corresponding to a particular request of the recorded UI interactions. Application execution therefore halts upon making a call corresponding to the request, facilitating debug of the issue.

Figure 1A:
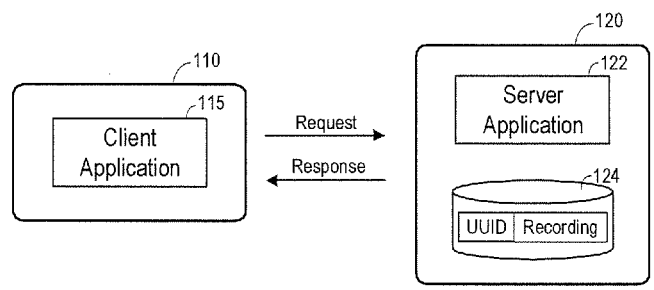
FIG. 1a is a block diagram of a client-server system supporting recording of user interface events according to some embodiments.

FIG. 1a illustrates "recording" of UI interactions according to some embodiments. Client device 110 may comprise any suitable computing system capable of executing client application 115. Client application 115 may be executed to present UIs to a user of client device 110, allowing the user to navigate through the UIs, select UI elements, and/or enter data into the UIs as is known in the art. Such navigation, selection and data entry may cause client application 115 to transmit corresponding requests to server system 120, which may transmit one or more responses in return.

Server system 120 may comprise any computing system capable of executing server application 122. During such execution, server application 122 may access data of datastore 124. According to some embodiments, server 120 includes a database server and a database application server executing server application 122. In this regard, data store 124 may comprise one or more of a single-node database, a distributed database, a row-store database, a column-store database, and a multi-tenant database.

Client application 115 may comprise a dedicated client of server application 122. Server application 122 may comprise a Web Server, in which case client application 115 may comprise a Web Browser or a dedicated client application.

Server system 120 may be located remotely from client device 110. Server system 120 is an "on-premise" server according to some embodiments. As will be described below, one or more components of server system 120 may be implemented as a cloud service.

According to one example of operation, a user operates one or more input devices (e.g., mouse, keyboard) of device 110 to execute client application and to manipulate UI elements of user interfaces displayed by client application 115. Manipulation of the UI elements may comprise selecting radio buttons or checkboxes, entering data into fields, selecting values from dropdown menus, or selecting "OK", "Enter" or "Apply" controls to confirm entered data. Each of these interactions may result in transmission of a request including an event and/or data to server system 120.

The requests are received by server application 122 (e.g., at a UI entry point of server application 122) and server application 122 determines appropriate responses thereto. Responses may be determined based on data stored in data store 124 and may include data and/or messages such as acknowledgement or error messages. Server system 120 transmits the responses to client application 115 as is known in the art.

As shown in FIG. 1a, data store 124 may store a recording of the events and data of one or more UI interactions. The contents and storage of the recording according to some embodiments will be described below. The recording may be indexed by a universal identifier, allowing for easy retrieval of the associated recording. Data store 124 may store many recordings for each of a plurality of users. In this regard, each record storing a recording may identify its associated user, timestamp, and any other suitable metadata.

Figure 1B:
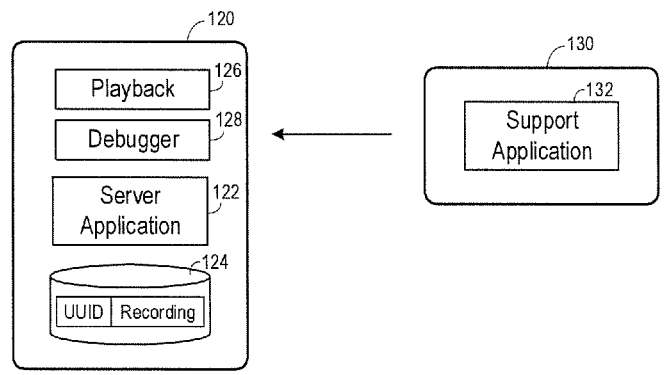
FIG. 1b is a block diagram of a server system supporting replay of recorded user interface events according to some embodiments.

FIG. 1b illustrates usage of a recording of UI interactions according to some embodiments. FIG. 1b illustrates additional components of server system 120 which may be utilized by a key user, administrator or other support personnel according to some embodiments. The additional components comprise playback application 126 and debugger application 128, but embodiments are not limited thereto.

An operator may operate device 130 to execute support application 132 in order to access playback application 126 and debugger 128. Support application 132 may comprise a Web Browser allowing the support personnel to login to a Web Server of system 120 which provides access to playback application 126 and debugger 128. Support application 132 may comprise a client application of playback application 126, while device 130 also executes a client application of debugger 128.

Generally, according to some embodiments, support application 132 instructs playback application 126 to select a recording from data store 124 and to replay the UI interactions described in the recording. As mentioned above, playback application 128 may replay the recording by issuing successive calls to a UI entry point of server application 122 in the same manner as the UI entry point was called in response to the UI interactions of the user illustrated in FIG. 1a. Server application 122 should respond in the same manner as in the FIG. 1a example. In some embodiments, the playback occurs while support application 132 is logged on to a tenant of system 120 corresponding to the user who executed the user interactions, under that user's credentials.

According to some embodiments, the operator may operate playback application 126 to request the setting of a debugger breakpoint at a particular request of the recorded UI interactions. As a result, replay of the recording of UI interactions halts at the request, which also halts execution of server application 122. Debugger application 128 may then be used to execute any suitable debugging of the halted application execution.

Each functional component described herein may be implemented in computer hardware (integrated and/or discrete circuit components), in program code and/or in one or more computing systems executing such program code as is known in the art. Such a computing system may include one or more processing units which execute processor-executable program code stored in a memory system.

Figure 2:
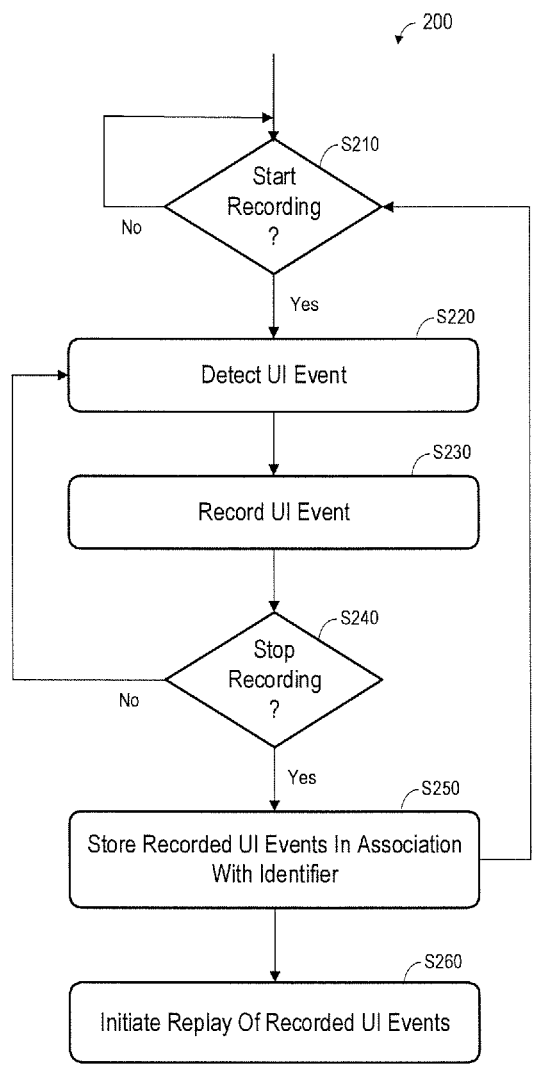
FIG. 2 is a flow diagram of a process to record user interface events according to some embodiments.

FIG. 2 is a diagram of a process according to some embodiments. Process 200 and the other processes described herein may be performed using any suitable combination of hardware and software. Software program code embodying these processes may be stored by any non-transitory tangible medium, including a fixed disk, a volatile or non-volatile random access memory, a CD, a DVD, a Flash drive, or a magnetic tape. Embodiments are not limited to the examples described below.

According to one example of operation, flow cycles at S210 until it is determined to begin recording UI interactions. According to some embodiments, the determination may be based on a "Start Recording" command input by a user into a user interface provided by client application 115. In other examples, it is determined to start recording upon successful login to server application 122. In still other examples, an administrator or other support user instructs server application 122 to begin recording in order to initiate a troubleshooting process. In this regard, process 200 may be executed by a client application to create and store recordings on a client device and/or by a server application to create and store recordings on a server system.

Once it is determined to start recording, a user interface event is detected at S220 based on user manipulation of UI elements of user interfaces displayed by the client application. The event may comprise a request which calls a UI entry point of the server application, and may consist of data alone, selection of a UI element, or both.

The detected UI event is recorded at S230. Recordation of an event may comprise adding the specific API call raised by the event to a data structure. Such a data structure may include any other suitable metadata, such as state information, user information, timestamps, or the like.

Next, at S240, it is determined whether to stop the recording. An instruction to stop recording may be received in any of the manners described above with respect to a start instruction. Certain UI events may be considered instructions to stop recording, such as a SAVE event. Flow returns to S220 if recording is to continue, and cycles between S220, S230 and S240 to detect and record additional UI events until it is determined to stop the recording.

FIG. 3 illustrates data of a recording according to some embodiments. The recording is organized as a series of requests. Each request indicates the productive class of the server application to which it is directed, details of one or more UI events associated with the request and, if present, data associated with the request. A request including only data may be associated with an event "0" or the like. The recorded data includes information needed to make the same calls to the server application which were made during the recording of the data, and may also include other information.

At S250, the one or more recorded UI events are stored in association with an identifier. According to some embodiments, the recorded UI events are stored as a database record with a unique Id as a primary key. Other metadata may be stored in the record to assist in searching a group of one or more stored records. In this regard, flow may return to S210 from S250 to initiate, record and store another recording.

Alternatively, a replay of recorded UI events may be initiated at S260. In some embodiments of S260, a user sends a sends a message to a support user indicating a time at which an issue arose. The support user may then operate a support application to identify a corresponding recording in the server data store, and replay the recording as described herein. Also in some embodiments, a user may initiate a recording to record a sequence of UI interactions which led to an error or other issue, and forward the recording to a support user at S260 to initiate the replay.

Figure 4:
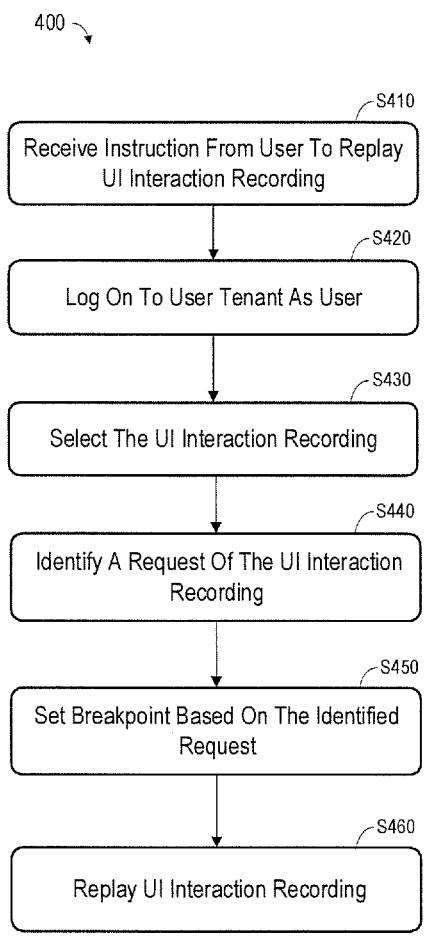
FIG. 4 is a flow diagram of a process to replay user interface events according to some embodiments.

FIG. 4 illustrates process 400 to replay a recording according to some embodiments. Initially, at S410, an instruction is received from a user to replay a recording of UI interactions. The instruction may be issued by the user as described above with respect to S260.

In response to the instruction, and typically with the permission of the user, a support user operates a support application at S420 (which may be the same as the client application used by the user) to log on to the user's tenant on the server system while "impersonating" the user. This process assists in ensuring that the response of the server application to the replayed UI interactions is the same as that experienced by the user.

The UI interaction recording is then identified at S430. The recording may be identified by searching the server system based on a unique Id or timestamp provided by the user, user alias, or other metadata. FIG. 5 illustrates interface 500 provided by a playback application executed on the server system and accessed by the support user. As shown, interface 500 includes many fields for inputting criteria by which a set of stored UI interaction recordings may be searched.

User interface 500 includes a field for indicating a request of the identified UI interaction recording at which a breakpoint should be set. For example, at S440, the support user may indicate that a breakpoint should be set in conjunction with Request 3 of the recording. Accordingly, an execution breakpoint is set at Request 3 at S450.

Next, at S460, the UI interaction recording is replayed. S460 may include unpacking the data of the recording, formatting it as required by corresponding API of the server application, and firing the formatted data to the API. This causes the system (e.g., a playback application) to call the same methods with the same events and parameters as called during creation of the recording, in order to execute the same code that was executed in response to the user's original UI interactions.

Figure 6:
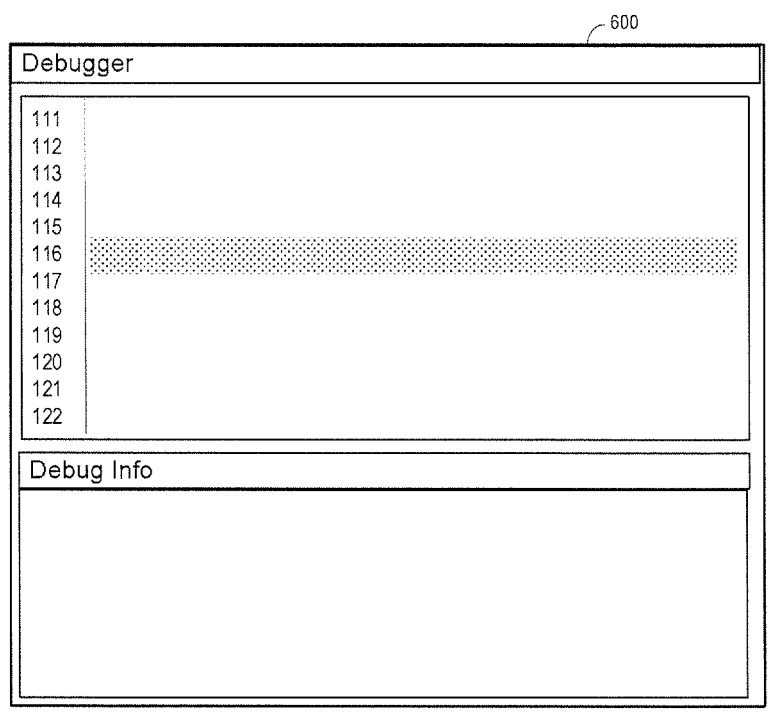
FIG. 6 depicts a user interface of a debugger including a breakpoint set based on a replayed recording of UI events according to some embodiments.

If a breakpoint was set at S450, execution halts upon reaching the breakpoint. With reference to the above example, execution halts at the firing of Request 3. Accordingly, a debugger application such as debugger application 600 of FIG. 6 may be used at this point to review the status of the halted server application as is known in the art.

Figure 7A:
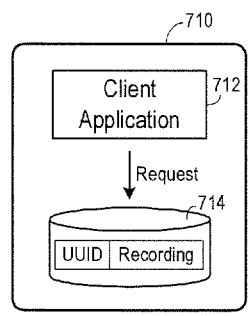
FIG. 7a is a block diagram of a client system supporting offline recording of user interface events according to some embodiments.
Figure 7B:
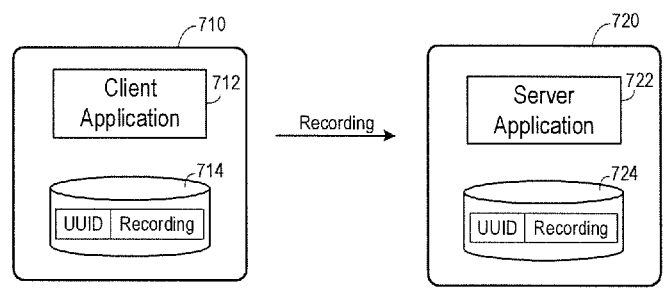
FIG. 7b is a block diagram of a client-server system supporting replay of recorded user interface events according to some embodiments.

FIGS. 7a and 7b illustrate embodiments in which a client device generates and stores UI interaction recordings. Such generation and storage may be performed in addition to the generation and storage by a server system as described above with respect to FIGS. 1a and 1b.

FIG. 7a shows client device 710 which may execute client application 712 in an offline mode. As such, client application 712 may issue requests to local storage 714 in response to user manipulations of user interfaces presented by client application 712. Simultaneously, client application 712 may execute process 200 to generate and store recordings of the UI interactions in storage 714.

FIG. 7b illustrates transmission of a selected recording from client device 710 to server system 720. Such a transmission may be initiated by a user upon detection of an error or other issue. According to some examples, such a transmission occurs during a conventional synchronization process upon re-establishment of a communication link between client device 710 and server system 720. Server system 720 may then selectively replay the recording as described above with respect to process 400.

Figure 8:
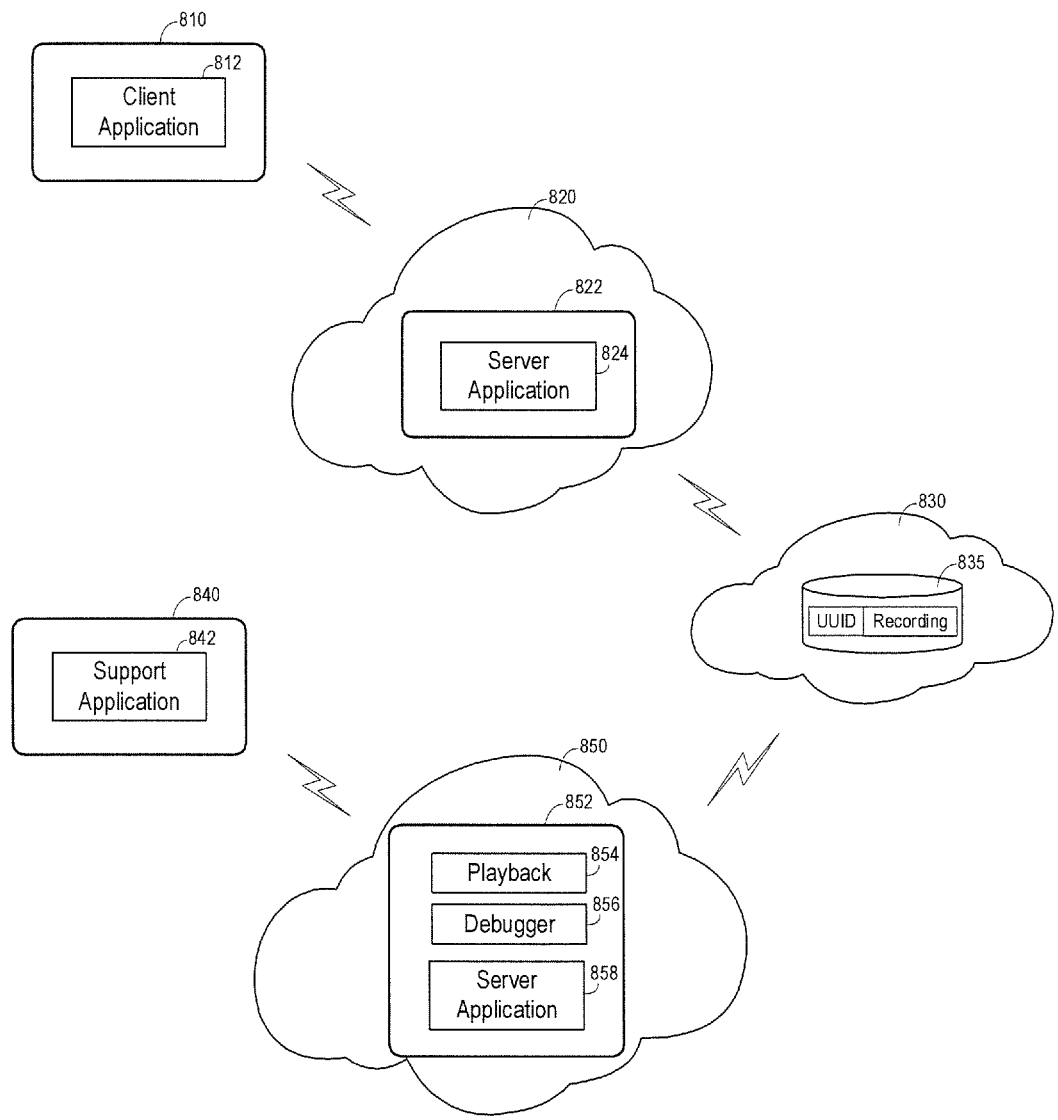
FIG. 8 is a block diagram of a cloud architecture supporting recording and replay of user interface events according to some embodiments.

FIG. 8 illustrates a distributed cloud-based architecture for implementing some embodiments. As shown, client device 810 operates client application 812 to interact with cloud-based server application 824 executing on server 822. Server 822 may be provided by one or more ad-hoc provisioned virtual machines provided by cloud infrastructure 820. Similarly, storage 835 may comprise distributed and uncoupled cloud storage used by server application 824 to store recordings of UI interactions (e.g., from client application 812) as is known in the art.

Device 840 executes support application 842 to interact with production server 852. Server application 858 executed by server 852 may be identical to application 824 executed by server 822 and used by support personnel to as a debug platform. Accordingly, server 852 also includes playback application 854 and debugger application 856 which may execute process 400 based on recordings stored in cloud storage 835.

Figure 9:
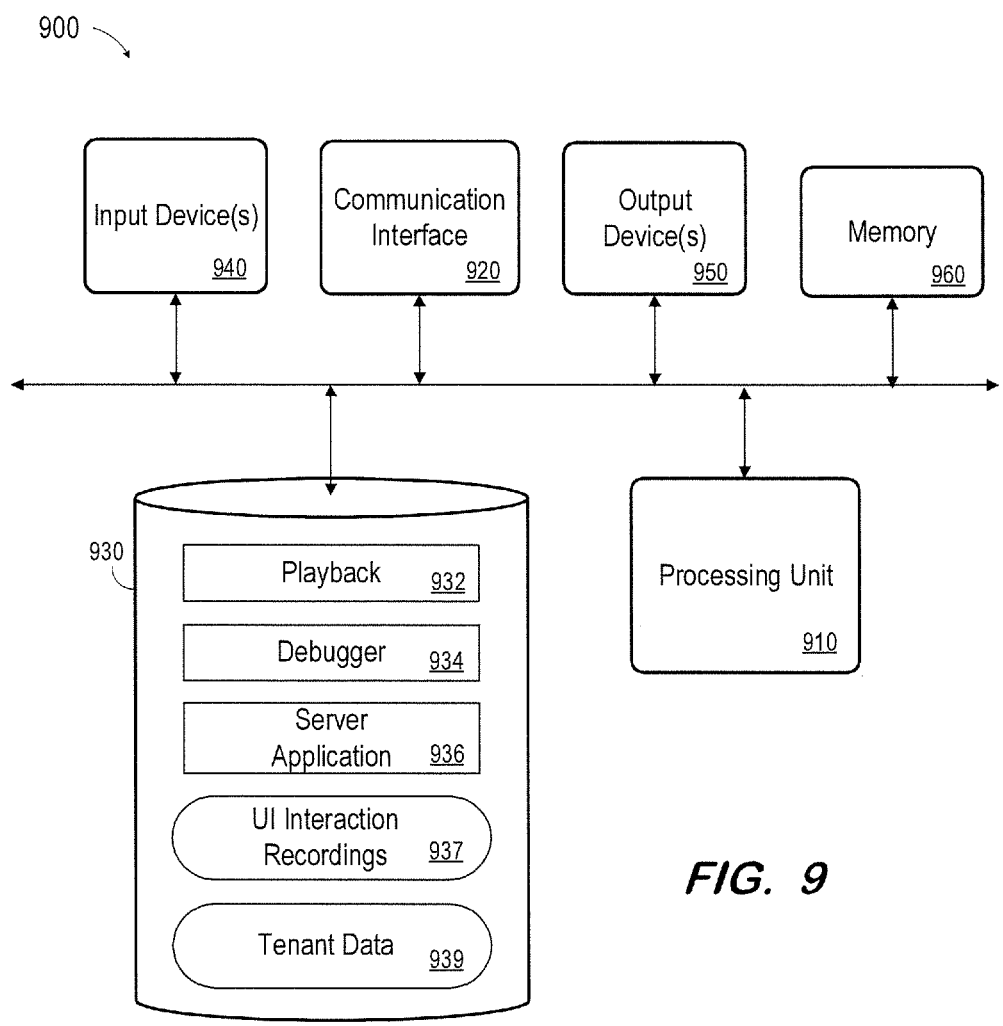
FIG. 9 is a block diagram of a server device according to some embodiments.

FIG. 9 is a block diagram of system 900 according to some embodiments. System 900 may comprise a general-purpose server computer and may execute program code to execute any one or more of the processes described herein as described herein. System 900 may be implemented by a cloud-based virtual server according to some embodiments.

System 900 includes processing unit 910 operatively coupled to communication device 920, persistent data storage system 930, one or more input devices 940, one or more output devices 950 and volatile memory 960. Processing unit 910 may comprise one or more processors, processing cores, etc. for executing program code. Communication interface 920 may facilitate communication with external devices, such as client devices, remote storage, and any other devices/peripherals. Input device(s) 940 may comprise, for example, a keyboard, a keypad, a mouse or other pointing device, a microphone, a touch screen, and/or an eye-tracking device. Output device(s) 950 may comprise, for example, a display (e.g., a display screen), a speaker, and/or a printer.

Data storage system 930 may comprise any number of appropriate persistent storage devices, including combinations of magnetic storage devices (e.g., magnetic tape, hard disk drives and flash memory), optical storage devices, Read Only Memory (ROM) devices, etc. Memory 960 may comprise Random Access Memory (RAM), Storage Class Memory (SCM) or any other fast-access memory.

As discussed herein, data storage system 930 may store program code of playback application 932, debugger 934, and server application 936. Processing unit 910 may execute such program code to cause system 900 to operate as described herein. System 930 also stores recordings of UI interactions 937 and tenant data 939 as described herein.

Data storage device 930 may also store data and other program code for providing additional functionality and/or which are necessary for operation of system 900, such as device drivers, operating system files, etc.

Each functional component described herein may be implemented at least in part in computer hardware, in program code and/or in one or more computing systems executing such program code as is known in the art. Such a computing system may include one or more processing units which execute processor-executable program code stored in a memory system.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Those in the art will appreciate that various adaptations and modifications of the above-described embodiments can be configured without departing from the claims. Therefore, it is to be understood that the claims may be practiced other than as specifically described herein.

What is claimed is:

1. An apparatus comprising:
   a memory storing processor-executable process steps; and
   a processing unit to execute the processor-executable process steps to cause the apparatus to:
   detect a set of sequential interactions with a user interface of a client application;
   store a recording comprising a set of sequential calls to a user interface entry point application programming interface of a server application caused by the set of sequential user interface interactions;
   associate the recording with an incident identifier;
   receive a request to analyze an incident associated with the incident identifier; and
   in response to the request, initiate playback of the recording on a second system which does not include an instance of the client application, wherein playback of the recording comprises issuing the set of sequential calls of the recording to the user interface entry point application programming interface of the server application.

2. An apparatus according to claim 1, the processing unit to execute the processor-executable process steps to cause the apparatus to:
   receive an instruction to set a breakpoint associated with one of the set of sequential calls to the user interface entry point application programming interface of the server application.

3. An apparatus according to claim 2, the processing unit to execute the processor-executable process steps to cause the apparatus to:
   based on the set breakpoint, pause play of the recording after issuing the one of the set of sequential calls to the user interface entry point.

4. An apparatus according to claim 1, the recording including data a second set of sequential calls to the user interface entry point application programming interface of the server application, and the processing unit to execute the processor-executable process steps to cause the apparatus to:
   in response to the request, issue the second set of sequential calls to the user interface entry point application programming interface of the server application.

5. An apparatus according to claim 4, the processing unit to execute the processor-executable process steps to cause the apparatus to:
   receive an instruction to set a breakpoint associated with one of the set of sequential calls to the user interface entry point application programming interface of the server application; and
   based on the set breakpoint, pause play of the recording after issuing the one of the set of sequential calls to the user interface entry point.

6. A method comprising:
   detecting a set of sequential interactions with a user interface of a client application;
   storing a recording comprising a set of sequential calls to a user interface entry point application programming interface of a server application caused by the set of sequential user interface interactions;
   associating the recording with an incident identifier;
   receiving a request to analyze an incident associated with the incident identifier; and
   in response to the request, initiating playback of the recording on a second system which does not include an instance of the client application, wherein playback of the recording comprises issuing the set of sequential calls of the recording to the user interface entry point application programming interface of the server application.

7. A method according to claim 6, further comprising:
   receiving an instruction to set a breakpoint associated with one of the set of sequential calls to the user interface entry point application programming interface of the server application.

8. A method according to claim 7, further comprising:
   based on the set breakpoint, pausing play of the recording after issuing the one of the set of sequential calls to the user interface entry point.

9. A method according to claim 6, the recording including a second set of sequential calls to the user interface entry point application programming interface of the server application, and the method further comprising:
   in response to the request, issuing the second set of sequential calls to the user interface entry point application programming interface of the server application.

10. A method according to claim 9, further comprising:
    receiving an instruction to set a breakpoint associated with one of the second set of sequential calls to the user interface entry point application programming interface of the server application; and
    based on the set breakpoint, pausing play of the recording after issuing one of the second set of sequential calls to the user interface entry point.

11. A system comprising:
    a client device to receive user input comprising a set of sequential interactions with a user interface of a client application, store a recording comprising a set of sequential calls to a user interface entry point application programming interface of a server application caused by the set of sequential user interface interactions, and associate the recording with an incident identifier; and
    a server device which does not include an instance of the client application, the server device to execute the server application, receive a request to analyze an incident associated with the incident identifier and playback the recording in response to the request, wherein playback of the recording comprises issuing the set of sequential calls of the recording to the user interface entry point application programming interface of the server application.

12. A system according to claim 11, the server device to:
receive an instruction to set a breakpoint associated with one of the set of sequential calls to the user interface entry point application programming interface of the server application.

13. A system according to claim 12, the server device to:
based on the set breakpoint, pause playback of the recording after issuing the one of the one of the set of sequential calls to the user interface entry point.

14. A system according to claim 13, the server device to:
receive an instruction to set a second breakpoint associated with a second one of the set of sequential calls to the user interface entry point application programming interface of the server application; and based on the set second breakpoint, pause play of the recording after issuing the second one of the set of sequential calls to the user interface entry point.

* * * * *